Patented July 22, 1952

2,604,408

UNITED STATES PATENT OFFICE 2,604,408

TREATMENT OF NATURAL, GROWN PRODUCTS TO INHIBIT DETERIORATION

Henry C. Marks, Glen Ridge, and Donn H. Horchler, Pompton Plains, N. J., assignors to Wallace & Tiernan Products, Inc., Belleville, N. J., a corporation of New Jersey No Drawing. Application March 2, 1951, Serial No. 213,675

12 Claims. (Cl. 99—156)

This invention relates to the treatment of natural, grown products, such as fruits and vegetables, to inhibit deterioration which is caused by microbial action, e. g. by fungus or bacterial growth. The prevention of decay in fresh fruits and vegetables has become a major problem in the produce industries, being especially related to the considerable length of time occupied in storage or shipment or both, between harvesting and ultimate use or retail distribution. In some instances the articles are held in storage for relatively long intervals, e. g. of the order of months in the case of lemons and sometimes other citrus fruits, or for times that may be somewhat shorter but nevertheless ample to encourage decay, in the case of other kinds of produce. Serious difficulties likewise arise, for articles such as cantaloupes or other melons, tomatoes, and many other fruits and vegetables during the period of shipment from growing areas to distant markets. During such intervals, which may range from several days to two weeks or more in the shipment of produce from California, Florida, and other southern States to northern and eastern markets, and likewise in shipments by sea, serious deterioration is of common occurrence, for example to the extent that large percentages of many or most shipments may be found to be more or less damaged by decay of microbial origin, even though refrigeration is effected during part or all of the time.

A considerable variety of procedures have been used or proposed for controlling decay, a few of such methods being quite effective, although subject to some limitations, either in scope of applicability or in expense or in difficulty of use, e. g. as in requiring treatments with gas which is corrosive to equipment or in requiring multiple operations, such as a combination of wash and gas treatments, with different substances. In the main, many of the proposed procedures fall short of complete satisfaction, for one or more of the following reasons, viz. in that they fail to exert a sufficiently sustained antimicrobial action, in that they are accompanied by some toxicity introduced in the produce, or in that they may cause some injury to the produce (injury to appearance alone being sufficient to impair or destroy marketability), or in that they may be accompanied by unpleasant odors.

The problem is particularly difficult because extensive experimentation has shown a complete lack of correlation between in vitro activity of anti-bacterial and anti-fungal agents, and their effectiveness in controlling decay of the sort mentioned above. That is to say, substances known or found to have strong antimicrobial action in laboratory tests or indeed in other situations, are in many cases found to be relatively ineffective when actually employed for the treatment of fresh, natural, grown products. It is possible that obstacles to the desired action of germicidal and fungicidal agents may reside in difficultly determinable properties of such substances, such as relative solubility in oil and water, or may be unpredictably affected by vapor pressures or like factors that govern penetration and absorption. In some cases there may have been specific inactivation of the agent by some material present on the produce. While it is difficult to say that any one or more of these factors is actually the cause of failure, the fact remains that in vitro activity is not a useful criterion of suitability for treatments of the character here contemplated. Furthermore, it is generally difficult to predict the suitability of a given agent in other respects, e. g. adaptability to ready application and distribution and retention over the surface of the produce, capability of prolonged action, and avoidance of undesirable effects such as toxicity, physical damage and unpleasant odor and taste.

To the attainment of the purposes described above and to the avoidance of unwanted effects, the present invention embraces the discovery that decay and similar defects, especially such as are caused by fungi but also to a considerable extent those caused by other microbial growth, can be readily controlled in a variety of natural, grown articles by suitable application of a specific class of substances selected from the group of compounds that may be defined as halogenated hydrocarbons, viz. hydrocarbons in which the hydrogen is replaced with halogen. Specifically, the invention involves the treatment of fruits and vegetables with one or more of the members of a class selected from the particular group which is defined as halogen derivatives of acetylene and ethylene in which all of the hydrogen is replaced with halogen of atomic weight greater than chlorine, i. e. bromine or iodine. The selected class of these halogenated hydrocarbons (wherein the halogen is of the group of bromine and iodine) is found to consist of halogenated acetylene in which at least part of the halogen is iodine, and halogenated ethylene; thus the compounds useful in the process are the iodine derivatives of acetylene and ethylene, like derivatives of both in which the hydrogen is replaced partly by iodine and partly by bromine, and the bromine derivative of ethylene, viz. tetrabromoethylene ($C_2Br_4$). In all cases, the hydrogen of the hydrocarbon ($C_2H_2$ or $C_2H_4$) is fully replaced by halogen, in the manner stated. Among the selected class of compounds, to which the invention relates, diiodoacetylene ($C_2I_2$) has been found notably effective, and tetraiodoethylene ($C_2I_4$) has proved to be of unusual and superior effect and to have special advantages, for the treatment of many fresh fruits and vegetables.

In general, other members of the broad group of halogenated acetylene and ethylene have been found unsuitable, i. e., in sharp contrast to the specific class of substances described above; some of such other compounds are highly unstable or non-lasting, and at least many of them are found to be wholly inactive when attempt is made to use them for controlling decay on produce, even in spite of indicated potency in vitro. Thus in moderate concentrations substances such as ethylene tetrachloride ($C_2H_2Cl_4$) are relatively ineffective; even though they may have heretofore been proposed for decay control, their decay-inhibiting effect is at best limited and is only achieved by using them in extraordinarily and indeed excessively high concentrations. In marked comparison, the compounds here defined are unexpectedly effective in a very superior way and in a wide range of concentrations including low values that are notable for economy and safety.

Among the materials of the specific class to which the method of the present discovery relates, present preference is for the ethylene derivatives, which appear to be quite stable and at least in a number of cases to be essentially odorless, there being some tendency (although not such as to negative essential utility) toward instability in the acetylene derivatives, and likewise some tendency to a slight odor in the latter compounds even when they are highly purified. In general, moreover, iodine derivatives are thought to be preferable to those of bromine; the attainment of far the best results in most cases being those achieved, as indicated above, by produce-treating procedure wherein the reagent is tetraiodoethylene. More particularly, it has been found that when various crops such as cantaloupes, lemons, oranges, tomatoes and other fruits and vegetables are treated with small amounts of one or another of the selected class of compounds, the onset of fungus decay and mold is very greatly delayed, and such deterioration is very greatly decreased in ultimate extent. The compounds are easy to apply and have been found eminently compatible with the described produce, both in affording a prolonged antimicrobial action and in avoidance of damage or other objectionable effects, i. e. when used in quantities which are abundantly sufficient for the desired purpose. So used, the compounds do not detract from the essential, marketable qualities of the fruits and vegetables, are non-toxic, and have been found to provide remarkable control of mold or decay over the usual intervals of storage and shipment.

The procedure involves application of the selected compound in any of a considerable variety of ways, e. g. as vapors, dusts, sprays or washes. For instance, in the situation of compounds having sufficiently high vapor pressure, for example diiodoacetylene, application of the substance as a vapor, for condensation or absorption on the surface of the produce, is satisfactory. In other cases, a very fine dust of the agent may be directed over the articles. Particularly effective application is achieved by spraying or especially by dipping or washing the articles, i. e. with a solution or suspension of the chosen compound or combination of such compounds.

Suitable solutions can be made in various organic solvents, such as alcohol or acetone or combinations of such solvents with each other or with water. Satisfactory water suspensions can be made by employing the compound, i. e. the stated halogen derivative, in a finely ground or micronized form (e. g. in the case of the normally solid members of the described class), preferably with a wetting or suspending agent. Since most of these compounds are extremely insoluble in water, are hydrophobic in nature and are of high density, wetting agents are advantageous, an especially useful agent being triacetin (also known as glyceryl triacetate), other examples of wetting agents being various sulfonated oils commonly used for such purposes, glycol mono-oleate, and the like. For example as little as 2% by weight of triacetin, relative to the amount of tetraiodoethylene, has been found extremely effective in making the latter compound readily wet by water. Both for dusting and for liquid suspensions, it appears very desirable that the halogenated hydrocarbon be reduced to a very fine particle size, e. g. a fine, impalpable powder.

An alternative way of obtaining a water suspension of finely divided character is to dissolve the compound in a water-miscible solvent such as alcohol or the like (preferably a saturated solution) and then to add a relatively large quantity of water, thus forcing precipitation of the compound, in the form of an extremely fine dispersion. For example, a saturated solution of tetraiodoethylene may first be made in ethylene glycol mono-methyl ether. The solution is then mixed with water, e. g. sufficient to obtain a concentration of about 1000 p. p. m. (parts per million) of the halogen derivative in the final mixture. The halogen derivative is thereby effectively precipitated in extremely fine form, no wetting agent being needed for dispersion. In lieu of a non-volatile solvent as just specified, a volatile solvent, for example isopropyl alcohol may be similarly employed, which will not remain on the fruit when the latter has been treated with the ultimate suspension.

As indicated, the compounds can be embodied in an emulsion, as by first dissolving in a suitable organic solvent and then emulsifying either directly with the total water or first with a concentrated solution of an emulsifier in water. By way of example, one suitable emulsion has been made as follows: a preliminary emulsion is prepared having a composition (by weight) of tetraiodoethylene, 2.5%, a naptha fraction, specifically a hydrocarbon solvent known as Solvesso 150, having a rather high boiling point, 50%, and the remaining 35.5% being a water solution of a sulfonated oil emulsifier, such emulsifier constituting 12% of the described, preliminary emulsion. This composition was made by dissolving the tetraiodoethylene in the naptha solvent, and then emulsifying the solution with the water solution of the sulfonated oil emulsifier. The final mixture is a fairly thick and reasonably stable emulsion, which can be added to water, e. g. in considerably larger quantities and indeed in any desired amount, so as to yield a final emulsion having any desired concentration of the stated anti-microbial agent.

While one advantage presently believed to reside in emulsions utilizing a non-volatile organic solvent, e. g. such as exemplified above (another such solvent being glycol mono-oleate, likewise non-miscible with water), is that after the produce has been treated and the water evaporates, the active agent remains in a fine film or in droplets of the non-volatile solvent, so that retention of the agent in active disposition is promoted. Another alternative type of liquid suspension, believed to be essentially equally advantageous in the respects just mentioned and yet substantially less costly from the standpoint of the amount of organic solvent employed, comprises a water suspension of the active compound, which contains a small quantity of an organic solvent (for the compound) that is non-miscible with water, such quantity being insufficient to dissolve all of the active agent. For example such a suspension may be prepared by introducing, into water, 2000 p. p. m. tetraiodoethylene and 2000 p. p. m. of glycol mono-oleate; if desired, a part of the tetraiodoethylene, or an additional but considerably smaller quantity of the same may be preliminarily dissolved in the stated organic solvent, e. g. to produce a saturated solution of the latter. A suspension of this sort appears to be very effective in at least a number of treatments, for example in the protection of cantaloupes during shipment. Specifically, there appears to be some reason for belief that special effectiveness of the halogenated hydrocarbon is achieved when the latter is actually present on the surface of the fruit in an organic solvent, and here, as distinguished from complete suspensions of solid particles (e. g. as produced by the solvent-precipitation method mentioned above) there is at least a substantial quantity of the active agent dissolved in tiny droplets of the solvent all of the time, i. e. promptly upon application and even before the water has evaporated. Furthermore, in the case of cantaloupes or like melons, transportation is usually effected in top-iced cars, so arranged that as the ice melts, water tends to trickle down through the packed produce. Whereas such water may tend to wash off a water miscible solvent, it will apparently not disturb a non-miscible solvent and thus will not disturb the active agent dissolved in the latter.

Finally, the treatment with compounds of the stated class may in many cases be performed by applying the compound to the paper or other wrapper in which the fruit, for example, is encased, e. g. as in the common practice of packing citrus fruit in individual paper wrappers. For such purposes, the compound should have a relatively substantial vapor pressure, i. e. such as to provide a slow release of the agent inside the wrapper and thus around the fruit over a long period of time. For example, tetraiodoethylene and diiodoacetylene are found to have vapor pressures of particularly suitable character, so as to afford a prolonged action when used on the fruit wrapper. It will be appreciated that the substance can be applied to the wrapper in various ways, e. g. by dipping or spraying the wrapper with a solution of the agent in a volatile solvent such as chloroform, alcohol or the like, or even directly by melting the halogenated hydrocarbon (if solid, as in the case of the straight iodine derivatives) and spraying or painting it on the paper, or by similar application in the case of the normally liquid derivatives (such as tetrabromoethylene).

It will be understood that in all cases, and especially where the compound is applied directly, as in solution, suspension or dust, to the surface of the produce, the amount or concentration should be appropriately regulated. Experience has indicated that no general limits of concentration can be specified for all types of produce, but informative and guiding examples are given below of various types of application, involving amounts of the active agent that have been found effective, while avoiding any possibility of injury and while remaining economical to employ. Indeed, it appears that the concentration to be used in any given case may be readily determinable by simple test, taking into account the various factors of time, humidity and other expected environment of the produce, i. e. factors which, like the nature of the produce and the type of decay, mold, rot or other deterioration to be controlled, are such as to require specific, but easily determinable concentrations. In general, the amount of the halogen derivative should be as low as possible, for economy, and also in some cases to avoid injury. For instance, in the case of produce, such as lemons and oranges, the use of a large excess of these agents may produce some injury to the rind, involving a pitting or discoloration.

Another satisfactory variation of the basic modes of application of the active agent is to incorporate the latter in a wax material which is applied to coat the article that requires protection. Thus it has been found, for instance, that the described halogenated hydrocarbons may be effectively incorporated in wax compositions corresponding to those commonly used to provide a wax coating on many types of fruit. By way of example, an emulsion of the type described above as made with a hydrocarbon solvent may be modified by incorporating in it, conveniently in combination with a mineral oil, a paraffin wax or a carnauba wax so as to yield a water wax emulsion. Indeed many wax emulsions suitable for carrying the presently described agents are known as employed, by themselves, for waxing citrus fruit, melons or the like. Alternatively waxes such as carnauba or mixtures containing it can be included in organic solvent solutions of tetraiodoethylene (or other member of the group of agents defined above), for application to the produce. In all of these cases, the ultimate result on the article is a film of wax which carries the anti-microbial agent in an effective, distributed disposition.

By way of one specific example of the procedure of the invention, reference may be made to one set of treatments of lemons with diiodoacetylene in vapor form, i. e. for controlling so-called green mold on the fruit. The diiodoacetylene was prepared in the form of a pure powder which was mixed with two parts by weight of infusorial earth, such dilution being effective to avoid any hazard of explosion or the like (such as might be caused by accidental impact), by reason of the corresponding tendency of diiodoacetylene in its pure state. The described mixture was placed in a tube and a stream of air passed through the latter at a convenient rate, e. g. such as to produce (by evaporation of the active compound) an effluent air mixture containing about 0.25 mg. (milligram) per liter of diiodoacetylene. For purposes of test, a quantity of lemons were placed in a suitable container after having first been wounded and inoculated with a culture of *Penicillium digitatum*, the causative agent of the common green mold decay of lemons. It may be noted that lemons so inoculated have been proven to decay at many times the rate at which such decay normally occurs in lemons.

The described treatment of lemons was effected by passing the stream of air, containing diiodoacetylene, into the container for successive prolonged intervals, e. g. 3½ hours every day, on each of 5 days out of 7. At the same time, a group of like lemons, similarly wounded and inoculated, was held as an untreated control. In the untreated group, every lemon showed positive signs of decay at the 4th day after inoculation, the decay increasing badly thereafter. Among the treated group, 78% were still good on the 4th day (i. e. showed no sign of decay), 50% were similarly unaffected on the 7th day, 44% on the 10th, and 36% on the 14th. It is therefore manifest that the treatment is of notable value in providing good keeping quality, and specifically in controlling decay, despite the seriously unfavorable conditions adopted for purposes of test. Further evidence indicates that although the named compounds have substantial fungicidal and bactericidal properties, their optimum effectiveness is generally achieved by virtue of fungistatic (or bacteriostatic) action. Thus where (as in most ordinary situations and as distinguished from the condition of special inoculation described above) an extremely rapid onset of decay is not so likely, the value of the present process is even more significant. On the other hand, to achieve the best protection that can be obtained with vapor applications alone, it appears necessary in many cases to build up a substantial surface concentration of the agent by successive treatments, and thereafter preferably to maintain periodic treatments (as above) to forestall the subsequent initiation of decay.

Indeed, in the case of articles that are to be held in storage or the like for a relatively long period, a combination of a dip and subsequent vapor treatment has certain superior advantages. The dip or wash treatment at the outset is important for protection against infection that might occur rapidly because of abrasions and cuts, especially when the storage house is busy with produce movements in and out and it is difficult or impossible to provide a prompt gas treatment for newly received material. On the other hand, during a long period of storage the active residue of an original dip will gradually dissipate, e. g. by vaporizing or by solution in constituents of the produce (and diffusion into the interior); the desired surface protection being lost, further treatments, as with vapor directed to the articles in their locality of storage, are necessary. Lemons represent a typical instance where conditions of long storage make the combination treatment very valuable; there are many other situations, however, in the case of various other products, where the requirements of protection are similarly exacting and prolonged.

By way of a second example, illustrating the combination treatment and again selecting highly unfavorable conditions, a group of lemons was first wounded and inoculated with the culture of the mold organism as described above. They were then dipped in a solution of 1% diiodoacetylene in isopropyl alcohol and allowed to dry. Thereafter the lemons were treated as in the first example, with a stream of air containing diiodoacetylene and produced in the same manner, except that the air velocity was such as to provide only about 0.12 mg. per liter of the halogen derivative. The treatment was effected over a period of several weeks, i. e. by applying the vapor for 4 hours per day, on each of 5 days out of every 7. An untreated, inoculated control of similar lemons was provided, receiving neither the dip nor the vapor treatments and resulting in mold on every lemon by the 4th day. In the case of the treated lemons, 96% were still free of mold on the 4th day, 92% on the 11th and 79% on the 21st, the results thus indicating highly effective control of deterioration caused by fungus. Thus in applying the procedure in the case of lemons which are kept in storage, e. g. for periods of months in conventional storage sheds or the like, and where decay normally would set in much more slowly, yet often inevitably, treatment effected in the manner of this second example is especially satisfactory. Essentially, the treatment involves the described preliminary wash, and then vapor treatment, i. e. by releasing the vapor into the storage room or rooms for a period of time of the order indicated, at regular intervals such as every day or so throughout the duration of storage.

Providing a third example of the practice of the invention, a group of lemons first wounded and inoculated with mold organism as described above, was dipped in a solution containing 0.1% tetraiodoethylene in ethyl alcohol, and allowed to dry. The lemons were then simply stored in a humid atmosphere at room temperature, e. g. under conditions prevailing in storage sheds where relatively high humidity is necessary to prevent the fruit from drying out. An untreated control (which like the other untreated controls, had been similarly wounded and inoculated) was stored under the same conditions. By the 5th day every lemon of the control showed fungus decay, while none of the treated lemons showed such decay or mold on the 5th day. Specifically, 100% of the lemons were good on the 5th day, 67% on the 10th day, and 50% on the 14th day, the results being thus remarkable, since there was no treatment whatever following the initial wash. For purposes of comparison, similar test was made with diphenyl, which is a previously proposed anti-fungal agent which has been found effective but which has the disadvantage of producing undesirable tastes and odors. In the comparison test, lemons similarly wounded and inoculated, were dipped in a 1% solution of diphenyl in ethyl alcohol. From such group, 83% were good on the 5th day, 58% on the 10th and 33% on the 14th, the results being thus less satisfactory than in the case of treatment according to the present invention, despite the fact that the diphenyl was used in 10 times the concentration of the iodoethylene and despite the present general understanding of the art that diphenyl is a very satisfactory decay control agent apart from its other disadvantages mentioned above.

A fourth example of the invention is represented by the treatment of cantaloupes with tetraiodoethylene. A suspension of this compound in water was made embodying 0.2% by weight of the compound, and including a sulfonated lignin in the amount of 15% of the weight of the iodoethylene, to achieve proper wetting and appropriate suspension of the active agent. Crates of cantaloupes as packed at the establishment of a shipper in California, were there flooded with the suspension. The liquid was flushed through the packed crates, thereby providing surface application equivalent to dipping and more effective than a simple spray. These crates, together with crates of untreated cantaloupes, were then loaded into the conventional refrigerated car and shipped from California to New York by freight in the usual manner. Upon arrival, representative crates of both treated and untreated categories were removed from the car and stored for 5 days at ordinary room temperature, thus simulating a minimum of local handling and storage time. At the end of this interval the treated melons showed no surface mold on any melon and only slight stem-scar mold on a few, for example only on 4 out of 27 in a representative crate. In contrast, the untreated melons showed undesirable deterioration, i. e. such as not only to impair the immediate marketability of the cantaloupes but to indicate likelihood of rapid and even more serious deterioration. For instance, in one representative crate of the untreated articles, only 1 melon out of 27 had no surface mold, all others being seriously affected. Likewise 24 out of the 27 had serious mold in the stem-scar, only three being unaffected in this respect. Substantially the same results, with comparative batches of treated and untreated cantaloupes, were obtained in a considerable number of other test shipments, carried out in the same manner, and all thus indicating the remarkable protection afforded by the present process.

As indicated by the examples, satisfactory results were obtained with liquid-carried distributions of tetraiodoethylene, appropriately washed on the produce, wherein the applied liquid contained from 1000 to 3000 p. p. m. of the active substance. As indicated above, however, requirements of concentration vary with the nature of the produce and with circumstances, so that no general specification of dosage can be given; yet as also indicated above, deviations from such concentrations to suit other conditions or for agents of the stated class, can be determined very easily in any given type of case. For instance, there is some evidence that smooth surfaced produce, such as tomatoes, requires a higher concentration in the wash treatment than cantaloupes, which have a much rougher surface; effective results in controlling so-called soft rot (occasioned by bacteria) in tomatoes have been achieved by spraying a water emulsion containing 2000 to 3000 p. p. m. of tetraiodoethylene (in some preference to a solution in an inorganic solvent), while good protection of cantaloupes (specifically against fungus-produced deterioration) is obtained with emulsions or simple suspensions containing 1000 to 2000 p. p. m. of the same compound.

It will now be seen that the procedure of the invention represents an effective mode of treatment for control of deterioration caused by microbial action or growth in a wide variety of produce. Easily controlled, the process affords no undesirable effects, either by way of damage or of taste or odor. Application of the stated compounds is simple and economical, requiring only small quantities of them, and may be effected in a variety of ways, e. g. as carried in various liquids, or applied as a dust or vapor (with or without moderate heating to generate the vapor) or even by impregnation in paper wrappers or the like. While examples of specific produce have been mentioned, such as lemons, melons and tomatoes, the procedure may be used for control of decay, mold or similar deterioration, e. g. of microbial origin at the surface, in a wide variety of natural products, such as other citrus fruits including oranges and grapefruit, and likewise still further fruits and vegetables that are often subjected to long intervals of storage and shipment, e. g. pears, onions, potatoes and many others. Although in a specific sense the invention is characterized by unusual results that are particularly related to produce such as fresh fruits and vegetables, the procedures herein described are also usefully applicable for the prevention or inhibition of decay, mold or other deterioration by organisms, in many other natural, grown products, examples being: seeds (for all kinds of farm and garden plants), which are apt to rot and mildew in storage or even in the ground and which can conveniently be treated with a dust containing the active agent; cut flowers, such as gladioli, that are commonly shipped over long distances; and bulbs and roots of various flowering plants, often stored for long times. For instance, the described halogenated hydrocarbons can be used in dusts or vapors, or in some cases sprays, to treat flowers, bulbs, roots and the like.

It is to be understood that the invention is not limited to the specific procedures hereinabove described, but may be carried out in other ways without departure from its spirit.

What is claimed is:

1. Procedure for inhibiting deterioration of natural, grown products, comprising treating the product with a halogenated hydrocarbon in which all of the hydrogen is replaced by halogen of greater atomic weight than chlorine and which is selected from the group consisting of: halogenated acetylene in which at least part of the halogen is iodine, and halogenated ethylene.

2. Procedure for inhibiting deterioration of natural, grown products, comprising applying to the product a liquid containing a halogenated hydrocarbon in which all of the hydrogen is replaced by halogen of greater atomic weight than chlorine and which is selected from the group consisting of: halogenated acetylene in which at least part of the halogen is iodine, and halogenated ethylene.

3. Procedure as described in claim 2, wherein the liquid containing the halogenated hydrocarbon is a water suspension of the said hydrocarbon in finely divided, solid form.

4. Procedure as described in claim 2, wherein the liquid containing the halogenated hydrocarbon is water containing the halogenated hydrocarbon in divided form distributed therein, at least part of said halogenated hydrocarbon being dissolved in an organic solvent which is non-miscible with the water and which is distributed in the water.

5. Procedure as described in claim 2, wherein the liquid containing the halogenated hydrocarbon is an organic solvent containing said halogenated hydrocarbon in solution.

6. Procedure for inhibiting deterioration of natural, grown products by microbial action at the surface thereof, comprising subjecting the product surface to vapor of a halogenated hydrocarbon in which all of the hydrogen is replaced by halogen of greater atomic weight than chlorine and which is selected from the group consisting of: halogenated acetylene in which at least part of the halogen is iodine, and halogenated ethylene, for a time sufficient to apply on said surface a quantity of said halogenated hydrocarbon for inhibiting microbial growth.

7. Procedure for inhibiting deterioration of natural, grown products by microbial action at the surface thereof, comprising distributing on the product surface to be protected, finely divided particles of a halogenated hydrocarbon in which all of the hydrogen is replaced by halogen of greater atomic weight than chlorine and which is selected from the group consisting of: halogenated acetylene in which at least part of the halogen is iodine, and halogenated ethylene.

8. In procedure for inhibiting growth of organisms on the surface of natural, grown products that are stored for periods of many days, the steps of treating the surface of the article with a liquid containing a halogenated hydrocarbon in which all of the hydrogen is replaced by halogen of greater atomic weight than chlorine and which is selected from the group consisting of: halogenated acetylene in which at least part of the halogen is iodine, and halogenated ethylene, to establish a distributed quantity of said halogenated hydrocarbon on said surface, and thereafter, at successive intervals during the period of storage, directing to the surface of the articles, air carrying a halogenated hydrocarbon in which all of the hydrogen is replaced by halogen of greater atomic weight than chlorine and which is selected from the group consisting of: halogenated acetylene in which at least part of the halogen is iodine, and halogenated ethylene, to maintain by successive reestablishment, a continuing concentration of halogenated hydrocarbon on the surface of the article.

9. Procedure for inhibiting deterioration of natural, grown products, comprising treating the surface of the product with tetraiodoethylene.

10. Procedure for inhibiting deterioration of natural, grown products, comprising treating the product with a liquid containing tetraiodoethylene, to establish a distribution of said tetraiodoethylene on the surface of the product.

11. Procedure for inhibiting deterioration of natural, grown products, comprising subjecting the product to vapor of tetraiodoethylene, for inhibiting microbial growth on the surface of the product.

12. Procedure as described in claim 1, in which the halogenated hydrocarbon is tetraiodoethylene and in which said treatment comprises applying throughout the product surface a liquid containing from about 1000 to about 5000 p. p. m. of said tetraiodoethylene distributed therein.

HENRY C. MARKS.
DONN H. HORCHLER.

REFERENCES CITED

The following references are of record in the file of this patent:

UNITED STATES PATENTS

| Number | Name | Date |
|---|---|---|
| 2,158,411 | Elion | May 16, 1939 |
| 2,193,636 | Marshall | Mar. 12, 1940 |

FOREIGN PATENTS

| Number | Country | Date |
|---|---|---|
| 619,723 | Great Britain | of 1949 |